Oct. 8, 1935.  J. E. BOOGE ET AL  2,016,536
PROCESS OF PRODUCING LITHOPONES OF LOW OIL ABSORPTION
Filed Jan. 27, 1932   3 Sheets-Sheet 2
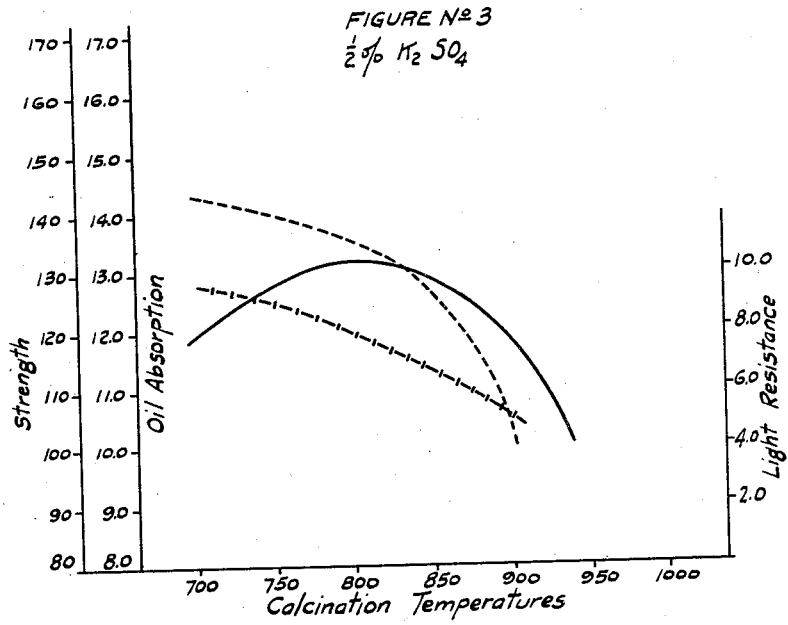
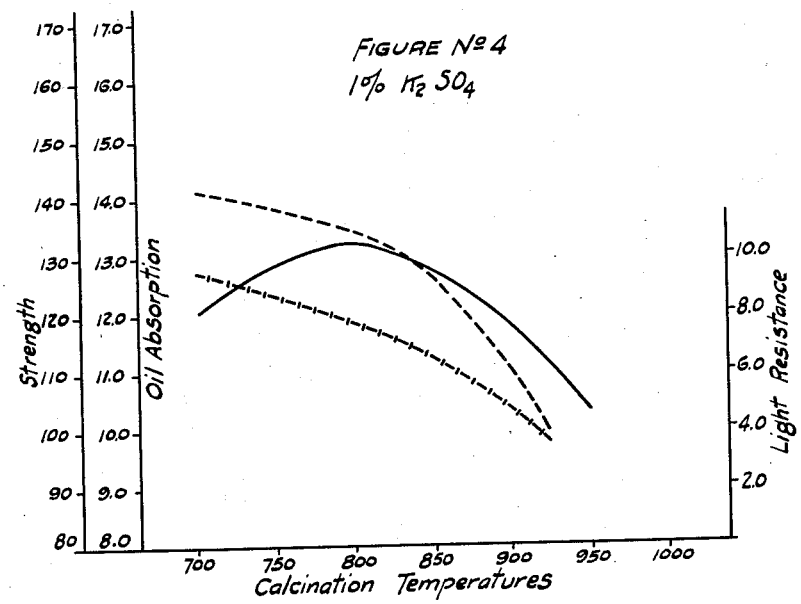
Strength ——————
Oil Absorption ------------
Light Resistance —·—·—·—·—
INVENTORS
JAMES E. BOOGE
ROBERT S. RADCLIFFE
BY George Lee
ATTORNEY.

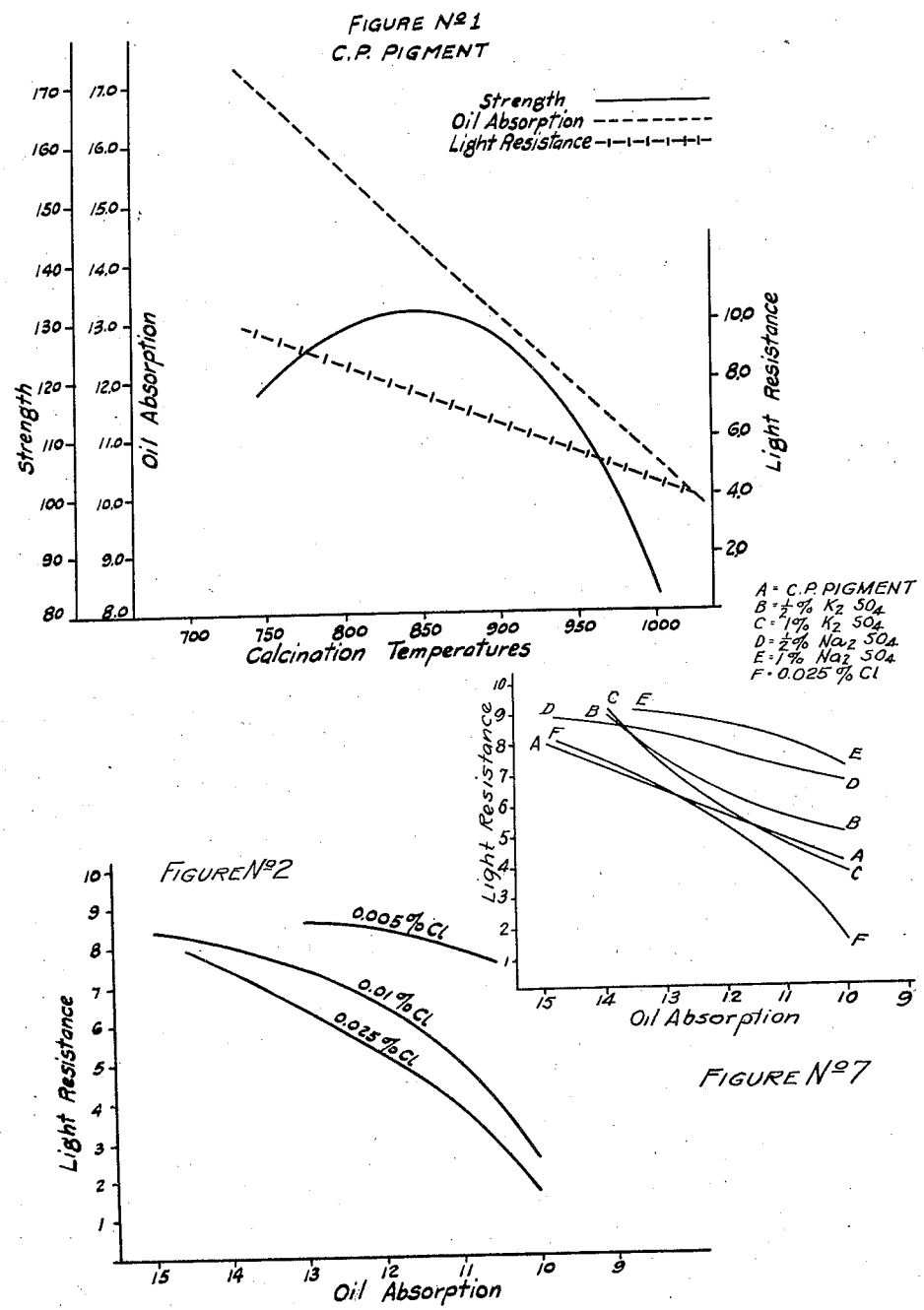

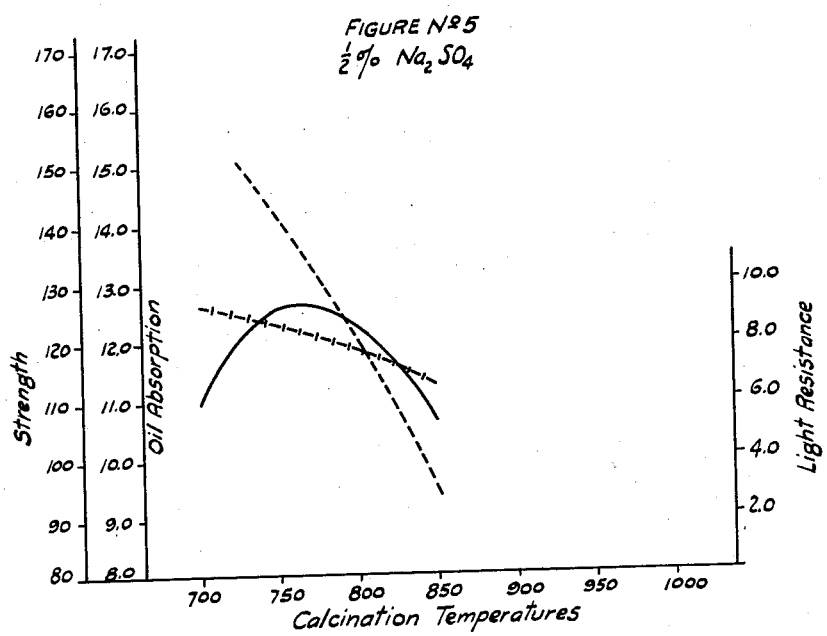
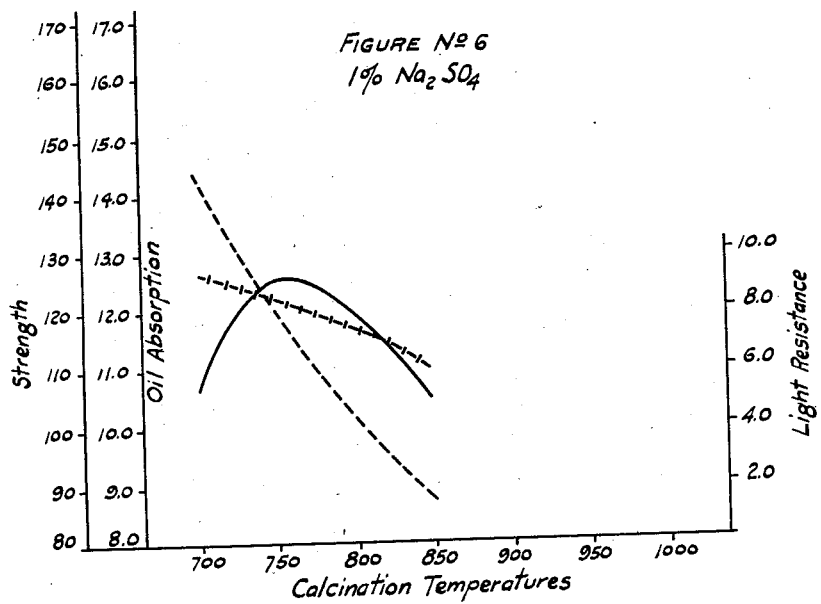

Patented Oct. 8, 1935

2,016,536

UNITED STATES PATENT OFFICE 2,016,536

PROCESS OF PRODUCING LITHOPONES OF LOW OIL ABSORPTION

James E. Booge and Robert S. Radcliffe, Newark, N. J., assignors to Krebs Pigment & Color Corporation, Newark, N. J., a corporation of Delaware Application January 27, 1932, Serial No. 589,200

15 Claims. (Cl. 134—78)

The present invention relates to processes of calcining lithopone pigments in which, through addition of various agents to the raw, uncalcined lithopone, and adjustment of the calcination temperatures, pigments of low oil absorption and otherwise satisfactory properties are obtained.

The old lithopone practice, before the development of light resistant lithopone, included the addition of large amounts of sodium chloride to the lithopone prior to calcination. These amounts ran up to 7% based upon the weight of pigment treated. The main object was to reduce the oil absorption of the lithopone to a low value which is particularly desirable for use in many types of paint. This large amount of chloride, however, had the extremely bad effect of making the lithopone light sensitive so that it turned gray when exposed to sunlight.

A number of years ago it was discovered that the elimination of chlorides from lithopone and its raw materials allowed the production of a light resistant pigment. (See Austrian Patent 18,034, Chem. Fab. Marienhutte, published in 1904). However, lithopone produced from raw materials containing no chlorides could not be calcined to produce a low oil absorption pigment. In fact, the oil absorption was so very high that the pigment was not at all suitable for paint purposes. A compromise was therefore reached so that controlled amounts of chlorides were added to reduce the oil absorption to an acceptable figure without making the pigment too light sensitive for paint use. This compromise process is in general use at the present time. It has allowed production of lithopones of excellent quality in the medium oil absorption range. However, when the oil absorption is reduced toward the very low figure which is desirable for many applications the light resistance drops off and the strength also decreases so that both properties become unacceptable for paint use. There has, therefore, been a definite limit in oil absorption which could not be passed by the use of chlorides.

We have now discovered other addition agents whose effect is entirely different from that of the chlorides which have heretofore been used. These addition agents have the advantage of reducing the oil absorption of the lithopone when calcined at a given temperature but do not have an adverse effect upon the light resistance. We have found that by the use of these addition agents the oil absorption of the lithopone can be reduced to the very low figure which has been desirable and that this low oil absorption can now be reached without rendering the pigment too light sensitive for paint uses. Another advantage of our newly discovered addition agents is that they do not have the same adverse effect upon the tinting strength of the lithopone as was the case with chlorides. Consequently, our agents which we prefer to call "water soluble light resistance maintaining heat resistant colorless compounds of the alkali and alkaline earth metals" differ completely from the previously used chlorides in their effect upon light resistance and tinting strength.

For the clear understanding of the present invention and for illustrating various phases thereof, we attach figures as follows: Fig. 1 shows the relation between calcination temperature and the properties of strength, light resistance, and oil absorption of a pigment prepared from chemically pure raw materials when calcined at the various temperatures indicated; Fig. 2 shows the relation between light resistance and oil absorption of calcined lithopone containing various amounts of chlorides; Fig. 3 is similar to Fig. 1, but the pigment was prepared from a zinc liquor of about 35° Bé. containing ½% potassium sulfate; Fig. 4 is similar to Figs. 1 and 3, but the zinc liquor contained 1% potassium sulfate; Fig. 5 is again similar to Figs. 1 and 3, but the zinc liquor contained ½% sodium sulfate; Fig. 6 is again similar to Figs. 1 and 3, but the zinc liquor contained 1% sodium sulfate; and Fig. 7 represents the relation between light resistance and oil absorption of various lithopones calcined according to our novel process.

The figures given in these various curves which represent values of strength, light resistance and oil absorption, correspond to well known standard tests, and as they are only comparative need not for the present purposes be defined in more detail. We might, however, state that for commercial purposes a strength of 115 is the lowest limit acceptable, strengths of 125 and more are common in commercial practice and usually desired. An oil absorption of 14 or more is not acceptable, whereas for certain purposes oil absorptions of 12 to 13 are of advantage but for different applications oil absorption figures of 11 to 10 or even less would be exceedingly valuable if the pigment has the other required properties. In the lightfastness scale, values of 5.5 are about the lowest limit at which a paint made from a particular pigment would stand a severe outside test, and figures above 6 are usually demanded from a lithopone for all around uses.

Fig. 1 shows three curves which illustrate the properties of lithopones prepared from chemically pure materials when calcined at various temperatures. The lithopones were of the usual equimolecular type. The horizontal axis gives the temperature of calcination in degrees centigrade. The divisions of the vertical axis have different values for the three curves; they range from 80 to 170 for the strength, from 8.0 to 17.0 for the oil absorption, and from 0 to 10 for the light resistance.

It will be seen from these curves that the maximum strength (132) was obtained at about 850° C., where the light resistance of 7.5 was excellent but the oil absorption of about 14.4 makes this pigment entirely unsuited for practical purposes.

It will further be seen from these curves that with higher calcination temperatures, both the oil absorption and the light resistance decrease only gradually whereas the strength drops away at such a rapid rate that, when a desirable low oil absorption is obtained, the strength figures are way below those commercially acceptable. To bring the oil absorption down to 11.0, which is a desirable low figure, the calcination temperature must be raised to 980° C., at which the strength has dropped to below 100 and the light resistance has dropped to less than 5, both properties which make the pigment entirely unacceptable.

The curves further show that by calcining the pigment at a temperature below that at which maximum strengths are obtained, the oil absorption would be in an entirely prohibitive range.

Due to the impossibility of producing from chlorine free material a lithopone pigment of entirely satisfactory properties of strength, light resistance, and low oil absorption, it has become the practice to add chlorides, usually in the form of sodium chloride, to the zinc sulfate solution or the precipitated lithopone. This addition of chloride decreases the necessary calcination temperature and produces a pigment of satisfactory oil absorption and acceptable tinting strength. The presence of chlorides, however, has the major disadvantage of decreasing the light resistance of the lithopone. It has, therefore, been necessary to so adjust the amount of chloride present within relatively narrow limits to allow a moderate calcination temperature and at the same time avoid the serious sacrifice in light resistance.

The effect of relatively small amounts of added chlorides upon the properties of the calcined lithopone is relatively large. This effect is illustrated in the curves of Fig. 2. The horizontal axis gives oil absorption values, and light resistance figures are plotted on the vertical axis. For purposes of simplification, the strength and calcination temperatures are omitted from these curves. The amounts of chlorine (Cl) indicated are expressed, as usual, as per cent of Cl contained in the zinc sulfate solution used to precipitate the lithopone, said solution being approximately 25% $ZnSO_4$ by weight.

It will be noted that for a given oil absorption the light resistance is decreased by increasing the amount of chloride. For example, at an oil absorption of 11.0, which is a desirable low figure, the lowest chlorine zinc liquor gives a light resistance of 7.8. The 0.01% chlorine reduces light resistance to 4.9 and 0.025% chlorine reduces it still further to 3.7.

It is obvious from these curves that the mere addition of chlorides does not allow the production of a very low oil absorption lithopone without loss of strength and too great a sacrifice in the light resistance. Another serious drawback in the use of chlorides is that with increasing chloride content the maximum strength which can be obtained on calcination of the pigment is progressively decreased.

We have discovered that certain substances, when present in small amounts in the raw pigment, have the effect that the maximum strengths are obtained at lower temperatures, at the same time decreasing the oil absorption of the pigment, and that they do not impair to any substantial extent the light resistance as is the case with chlorides. As a matter of fact, for a given low oil absorption the light resistance of pigments within the commercial range of strengths produced according to our invention, is higher than the light resistance of pigments which have been calcined to the same low oil absorption with chlorides or without the addition of any foreign substances.

Our invention comprises so adjusting or controlling the addition of such substances and the calcination temperature of the pigment that at the desired predetermined low oil absorption a pigment of commercial strength with excellent light-fastness property is obtained.

Such substances which do not impair the light resistance are, in general, non-colored, heat-resistant, water-soluble compounds of the alkali and alkaline earth metals. We have found that besides chlorides, phosphates have the property of impairing the light resistance of lithopones. We, therefore, exclude chlorides and phosphates from the class of materials which we choose to designate as "light-resistance maintaining, non-colored, heat-resistant, water-soluble alkali and alkaline earth metal compounds".

The general effect of this class of materials, when added to lithopone before calcination, is to decrease the temperature at which maximum strength is obtained. At the same time, the oil absorption of the calcined lithopone is lowered below that obtained by calcination at the same temperature of a lithopone free from these added materials; the light resistance of lithopones calcined at a given temperature with or without our addition agents is quite similar and as this light resistance is maintained while the oil absorption is lowered, the light resistance at a given oil absorption is greatly improved.

The following are a few of the materials which have been used by us and found useful in producing, according to our invention, lithopones of low oil absorption and otherwise required properties. They do not impair the light fastness but reduce the oil absorption of the pigment when compared with pigments calcined at higher temperatures to the same strength without our addition agents. These materials are sodium sulfate, potassium sulfate, sodium carbonate, sodium sulfid, sodium hydroxide, magnesium sulfate, etc. Of these substances the first two, namely, sodium and potassium sulfate have been found to be particularly effective. The other materials mentioned above, while producing the desired lowering of oil absorption, have been found to produce in lithopone a tinting strength inferior to that produced with the alkali metal sulfates, but the tinting strength at low oil absorption and the light fastness are still within commercial possibilities. Of these substances, sodium sulfid more nearly approaches in its effectiveness sodium and potassium sulfate.

The amount of light-resistance maintaining, heat-resisting, water-soluble alkali and alkaline earth metal compounds needed to produce lithopones of low oil absorption is usually larger than $\frac{1}{10}$ of 1%; increasing amounts show progressively increasing effects. Thus 1% of the added agents decreases the maximum strength temperatures more than 0.5% and likewise lowers the oil absorption for a given temperature to a greater degree. Amounts larger than 1%, even up to 10%, have been found to produce beneficial effects though the rate of increase of the effect becomes, above 1%, considerably slower, and it will be found, in most instances, that a desired low oil absorption with otherwise satisfactory properties can be obtained by using from about 0.25 to 1% of the addition agents and calcining at a temperature below that at which a pure pigment would produce the desired low oil absorption.

The effect of our addition agents cannot be calculated in advance, as the rate of change of the properties of the lithopone for increasing amounts of the added material is not the same from one agent to another, nor is it the same with a given agent for raw pigments precipitated in different manners. Thus it is necessary to determine in advance the effect of each added material as a basis for controlling the properties of the lithopone by such additions.

We can say that, as a rule, when the temperature has been determined at which a predetermined low oil absorption is produced from a pure pigment, a similar low oil absorption and satisfactory commercial properties will be produced from the same pigment with the addition of from about 0.2 to 1% of our novel addition agents when calcined at a temperature of from 70 to about 200° C. lower, and in certain instances as low as 225° C. below the temperature required for a C. P. pigment.

The figures for the amounts of addition agents in the uncalcined lithopone as given herein represent the amount thereof contained in the zinc sulfate solution of 35° Bé. used for the precipitation of the raw pigment. It is to be understood that the added water soluble material is not completely taken up by the raw lithopone precipitate; part of the material stays in solution and is removed from the pigment in the filtrate. However, an amount of the added material remains in the lithopone corresponding usually to 25 to 50% of the total quantity added. There is positive absorption of the water-soluble material by the raw lithopone pigment as evidenced by the fact that more of the added material remains in the raw presscake than would correspond to the amount of moisture present in this presscake. Alternately, the water-soluble addition agent can also be added to the raw pigment slurry before calcination or in any other desired manner. In any case, the addition agent must be introduced prior to calcination as it has its effect during the calcination step.

Specifying the amount of addition agent required in the raw pigment by the amount contained in the zinc liquor is preferred over any other method as it is quite difficult and impractical to determine the amount of addition agent firmly bonded to the pigment by absorption.

Our invention will be illustrated in the following in connection with the use of the alkali metal sulfates which we found to be the most potent addition agents useful for the production of lithopones of low oil absorption. As a matter of convenience, we present the results of a vast number of experiments in the form of curves and tables.

The table below gives comparative light fastness figures obtained on pigments calcined at the temperatures stated with or without the addition of an alkali metal sulfate.

*Light fastness at various calcination temperatures in degrees C.*

| Addition agent | 700 | 750 | 800 | 850 | 900 |
|---|---|---|---|---|---|
| None | | 9.6 | 8.5 | 7.5 | 6.5 |
| ½% K₂SO₄ | 9.7 | 9.0 | 8.0 | 6.8 | 5.0 |
| 1% K₂SO₄ | 9.5 | 8.6 | 7.7 | 6.4 | 4.7 |
| ½% Na₂SO₄ | 9.3 | 8.6 | 7.7 | 6.6 | |
| 1% Na₂SO₄ | 9.7 | 8.5 | 7.5 | 6.0 | |
| 0.125% Cl | 3.6 | 1.6 | 0.5 | 0.0 | |

While there is a drop in light resistance in the sulfate containing pigments, this is relatively small in the range of low calcination temperatures and the pigments are clearly within commercial standards, whereas the addition of chlorine material causes a considerably greater decrease of light-fastness.

The following table illustrates the decrease in temperature at which pigments of maximum strength are obtainable by the use of our addition agents:

*Maximum strength obtainable*

| Addition agent | Calcination temperature °C. | Strength | Oil absorption | Light resistance |
|---|---|---|---|---|
| C. P. Pigment | 855 | 132 | 14.3 | 7.4 |
| ¼% K₂SO₄ | 805 | 132 | 13.4 | 7.6 |
| 1% K₂SO₄ | 800 | 132 | 13.4 | 7.7 |
| ½% Na₂SO₄ | 765 | 127 | 13.4 | 8.4 |
| 1% Na₂SO₄ | 750 | 126 | 12.0 | 8.5 |
| 0.125% Cl | 700 | 120 | 12.0 | 3.4 |

The figures of the above two tables, though of interest for the understanding of our invention, lack practical significance if taken alone. A pigment of even the highest light fastness is devoid of practical application if it is too low in strength, or if it has a prohibitive oil absorption. On the other hand, high calcination temperatures must be avoided due to the technical difficulties encountered in operating at such temperatures, 850° C. being a practical maximum for successful commercial operations. It is, therefore, necessary to consider the four factors—strength, light resistance, oil absorption, and calcination temperature—before a practical calcination process can be adopted, and it is, in most instances, necessary to sacrifice one of the conditions if the other three must be obtained. Our novel process, which is particularly devised for the production of lithopones of low oil absorption, allows achieving this without undue sacrifice of any of the other properties.

Attached Figs. 3, 4, 5 and 6 illustrate the relationship between the four factors discussed above on pigments calcined with various amounts of alkali metal sulfates. These figures are entirely similar to Fig. 1 and should be compared therewith.

One of the interesting aspects of the problem of producing lithopones of low oil absorption is distinctly shown on these figures, namely, that with the use of alkali metal sulfates the oil absorption decreases at a faster rate than the strength, whereas on a C. P. pigment (see Fig. 1) the strength decreases faster than the oil absorption. The figures also show that the rate of decrease of light fastness with increasing calcination temperatures is with sulfates of the same order as with a C. P. pigment.

The following table gives a comparison of the calcination temperatures required to obtain a predetermined oil absorption and the strength and light resistance obtained as such temperatures:

*Properties at various oil absorptions*

| Addition agents | Calcination temperature in degrees C. | Strength | Light resistance |
|---|---|---|---|
| Oil absorption of 13.0 | | | |
| None | 905 | 126 | 6.5 |
| ½% K₂SO₄ | 835 | 130 | 7.2 |
| 1% K₂SO₄ | 830 | 130 | 7.0 |
| ½% Na₂SO₄ | 775 | 126 | 8.3 |
| 1% Na₂SO₄ | 725 | 121 | 9.0 |
| Oil absorption of 12.0 | | | |
| None | 945 | 114 | 5.6 |
| ½% K₂SO₄ | 870 | 126 | 6.2 |
| 1% K₂SO₄ | 870 | 124 | 5.8 |
| ½% Na₂SO₄ | 800 | 123 | 7.7 |
| 1% Na₂SO₄ | 750 | 126 | 8.6 |
| Oil absorption of 11.0 | | | |
| None | 980 | below 100 | 4.9 |
| ½% K₂SO₄ | 880 | 121 | 5.6 |
| 1% K₂SO₄ | 900 | 118 | 4.7 |
| ½% Na₂SO₄ | 820 | 116 | 7.2 |
| 1% Na₂SO₄ | 775 | 125 | 8.0 |
| Oil absorption of 10.0 | | | |
| None | 1025 | way below 90 | 4.0 |
| ½% K₂SO₄ | 900 | 119 | 5.0 |
| 1% K₂SO₄ | 925 | 112 | 3.6 |
| ½% Na₂SO₄ | 840 | 111 | 6.7 |
| 1% Na₂SO₄ | 805 | 119 | 7.2 |

This table shows, for instance, that when an oil absorption of 13 is desired, the additon of 1% potassium sulfate to the zinc liquor will produce such a pigment at a calcination temperature about 75° below that required with a C. P. pigment, at the same time producing a stronger pigment of better light resistance.

Or, if an oil absorption of 10 is desired, one has to add 1% sodium sulfate and calcine at about 805° C. whereby a pigment of satisfactory strength and excellent light resistance is obtained.

For all around uses, sodium sulfate added to the zinc liquor in amounts from 0.5 to 1% appears to be the most practical addition agent. While it gives for an oil absorption of 13 a somewhat lower strength than potassium sulfate, the light resistance is higher and it is merely a matter of considering the uses of the particular pigment to decide if light fastness or strength should be favored.

Fig. 7 illustrates the relationship between oil absorption and light resistance of pigments calcined with or without addition agents. The oil absorption figures are plotted on the horizontal axis and light resistance figures on the vertical axis. Curve A represents pigments obtained from chemically pure raw materials without any addition agents, and it shows that with an oil absorption of 12 the light resistance has already practically reached the lowest permissible limit; referring to Fig. 1, it will be seen that the strength is also at the lowest limit of about 115 and the calcination temperature of 950 required makes this weak pigment rather impractical.

Curve F represents pigments calcined with 0.025% Cl, while in the upper brackets of oil absorption the light fastness is practically the same as that of a C. P. pigment; this property drops off quite rapidly at lower oil absorptions and renders this addition agent entirely unsuited for the production of low oil absorption pigments.

Curves B, C, D, and E represent pigments with alkali metal sulfates as indicated in the legend on this figure. It will be seen, with one exception, that at any given oil absorption the light fastness of the pigment is considerably above that of a calcined C. P. pigment, or a pigment calcined with a chloride as an addition agent. The exception relates to 1% K₂SO₄ for which, at oil absorption below about 11.5, the light resistance is slightly below that of the C. P. pigment, but well above that of the chlorine pigment. This table clearly substantiates our contention that our addition agents maintain the light resistance of a pigment while lowering its oil absorption.

It is usually well known in an efficient lithopone manufacturing unit at what calcination temperature a C. P. pigment precipitated in a certain manner will produce a predetermined oil absorption, or if it is not known it can easily be determined by laboratory trials. According to our invention, the same oil absorption will be produced by calcining, at a temperature of from 70 to 200° C. below that of the C. P. pigment, a raw pigment prepared with from about 0.25 to 1% of our light-resistance maintaining, heat-resistant, colorless, alkali and alkaline earth metal compounds.

We then determine in a preliminary laboratory trial the amount of added material required to reduce the temperature at which maximum strength is obtained to the point which can readily be maintained in practical calcination furnaces. At the same time we determine the exact calcination temperature and the exact amount of added material necessary to decrease the oil absorption to the desired low level. We further test in this preliminary laboratory study the light resistance of the different samples produced. From these different results we draw our conclusions and can adjust and control the amount of added material and the calcination temperature for the plant operation to produce the pigment of the desired properties.

It must, of course, be understood that the same principles discussed above apply when limited small amounts of chlorine are naturally present in the lithopone or in the raw materials used to precipitate the lithopone as is usually the case. The prior art practice has been to try to control the amount of chlorine in the lithopone or the raw materials and then calcine at a sufficiently high temperature to produce the desired oil absorption. This calcination temperature is frequently so high that the light resistance and strength dropped off to an undesired point. It is now possible, by the use of the present invention, to add our light resistance maintaining heat resistant colorless alkali and alkaline earth metal compounds and reduce the required calcination temperature to a point where the light resistance and strength will not drop so low as to be unacceptable for paint use. This controlled addition of our new agents is particularly useful in production of low oil absorption lithopone where the adverse effect of chlorine upon light resistance is particularly apparent in the absence of our added agents.

As a result of the lower calcination temperature, the light resistance does not drop off as it does when the same raw pigment containing chlorine, but without the addition of our materials, is calcined to give the low oil absorption. Consequently, the amount of added material which it is necessary to incorporate with a raw lithopone containing a definite amount of chlorine can be determined by preliminary tests,—such an amount of added material being chosen so that the desired low oil absorption is obtained at a sufficiently low calcination temperature at which the chlorine present in the pigment does not reduce the light resistance below a point suitable for paint uses.

The appended claims are intended to embrace broadly processes in which raw pigments are used which contain some chlorine as well as chlorine free raw pigments.

We claim:

1. In a process of producing a lithopone of predetermined oil absorption the steps of incorporating into an uncalcined, raw lithopone an alkali metal sulfate and calcining said lithopone at a temperature from about 70 to 200° C. less than that at which said raw lithopone without said added alkali metal sulfate produces a pigment of the same predetermined oil absorption.

2. In a process of producing a lithopone of predetermined oil absorption, the step of calcining a raw lithopone containing an amount of an alkali metal sulfate corresponding to the amount of said sulfate remaining in the raw lithopone when it is produced from a 35° Bé. zinc sulfate solution containing from about 0.1 to 1% of said alkali metal sulfate, said calcining being effected at a temperature from about 70 to 200° C. less than that at which said raw lithopone without that content of alkali metal sulfate produces a pigment of the same predetermined oil absorption.

3. In a process of producing a lithopone of predetermined oil absorption the steps of calcining a raw lithopone containing an amount of sodium sulfate corresponding to the amount of said sulfate remaining in the raw lithopone when it is produced from a 35° Bé. zinc liquor containing from about 0.2 to 1% sodium sulfate, said calcining being effected at a temperature from about 70 to 225° C. less than that at which said raw lithopone without that content of sodium sulfate produces a pigment of the same predetermined oil absorption.

4. The process of producing a lithopone of low oil absorption which comprises calcining at a temperature of from 725 to 850° C. a raw lithopone containing an amount of sodium sulfate corresponding to that remaining in the raw lithopone when it is precipitated from a 35° Bé. zinc liquor containing from about 0.5 to 1% sodium sulfate.

5. The process of producing a lithopone of very low oil absorption with satisfactory strength and light fastness which comprises calcining at a temperature of from about 775 to 810° C. a raw lithopone containing an amount of sodium sulfate corresponding to that remaining in the raw lithopone when it is precipitated from a 35° Bé. zinc liquor containing about 1% sodium sulfate.

6. In a process of producing a lithopone pigment of low oil absorption, the step of calcining a raw lithopone in the presence of a small amount of an alkali metal sulfate under conditions which produce a pigment of predetermined low oil absorption with satisfactory strength and satisfactory light fastness, such conditions having been established by calcining a similar raw lithopone in the presence of various amounts of said alkali metal sulfate and at various temperatures and determining in each instance the oil absorption, light resistance and strength of the so obtained pigments.

7. In a process of producing a lithopone of predetermined oil absorption the steps of incorporating into an uncalcined raw lithopone a definite amount of an alkali metal sulfate and calcining said lithopone at a temperature substantially lower than that at which said raw lithopone without said added alkali metal sulfate produces a pigment of the same predetermined oil absorption.

8. In a process of producing a lithopone of predetermined oil absorption the step of calcining a raw lithopone containing a definite amount of an alkali metal compound the anion of which is chosen from the group consisting of —OH, —$CO_3$, and the anion of inorganic sulfur acids, said calcination being effected at a temperature substantially lower than that at which said raw lithopone in the absence of said alkali metal compound produces a pigment of the same predetermined low oil absorption.

9. In a process of producing a lithopone of predetermined oil absorption the step of calcining a raw lithopone containing a definite amount of sodium sulfate at a temperature substantially lower than that at which said raw lithopone in the absence of said sodium sulfate produces a pigment of the same predetermined low oil absorption.

10. In a process of producing a lithopone of predetermined oil absorption the step of calcining a raw lithopone containing a definite amount of potassium sulfate at a temperature substantially lower than that at which said raw lithopone in the absence of said potassium sulfate produces a pigment of the same predetermined low oil absorption.

11. In a process of producing a lithopone of predetermined oil absorption the step of calcining a raw lithopone containing a predetermined amount of an alkali metal compound the anion of which is chosen from the group consisting of —OH, —$CO_3$ and the anions of inorganic sulfur acids, said calcination being effected at a temperature from about 70 to 200° C. less than that at which said raw lithopone in the absence of said alkali metal compound produces a pigment of the same predetermined oil absorption.

12. In a process of producing a lithopone pigment of low oil absorption, the step of calcining a raw lithopone containing a small amount of an alkali metal compound, the anion of which is chosen from the group consisting of —OH, —$CO_3$ and the anions of inorganic sulfur acids, said calcination being effected under conditions which produce a pigment of predetermined low oil absorption with satisfactory strength and satisfactory light-fastness, such conditions having been established by calcining a similar raw lithopone in the presence of various amounts of said alkali metal compound and at various temperatures and determining in each instance the oil absorption, light resistance and strength of the so obtained pigments.

13. The process of producing a lithopone of low oil absorption which comprises calcining at a temperature of from 725 to 850° C. a raw lithopone containing a specified amount of an alkali metal compound the anion of which is chosen from the group consisting of —OH, —$CO_3$ and the anions of inorganic sulfur acids, said amount being such that the amount of alkali metal cation contained in said raw lithopone is equivalent to the sodium contained in a raw lithopone which has been precipitated from a 35° Bé. zinc liquor containing from about 0.1 to 1% sodium sulfate.

14. The process of producing a lithopone of low oil absorption which comprises calcining at a temperature of from 725 to 850° C. a raw lithopone containing an amount of an alkali metal sulfate such that the amount of alkali metal cation is equivalent to the sodium contained in a raw lithopone which has been precipitated from a 35° Bé. zinc liquor containing from about 0.1 to 1% sodium sulfate.

15. The process of producing a lithopone of low oil absorption which comprises calcining at a temperature of from 725 to 850° C. a raw lithopone containing an amount of sodium sulfate corresponding to that remaining in the raw lithopone when it is precipitated from a 35° Bé. zinc liquor containing from about 0.1 to 1% sodium sulfate.

JAMES E. BOOGE.
ROBERT S. RADCLIFFE.